US008316026B2

(12) United States Patent
Uchino et al.

(10) Patent No.: US 8,316,026 B2
(45) Date of Patent: Nov. 20, 2012

(54) METHOD AND SYSTEM FOR KEYWORD MANAGEMENT

(75) Inventors: Kanji Uchino, Kawasaki (JP); Tetsuro Takahashi, Kawasaki (JP); Jun Zhang, Beijing (CN); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 287 days.

(21) Appl. No.: 12/501,954

(22) Filed: Jul. 13, 2009

(65) Prior Publication Data

US 2009/0276424 A1 Nov. 5, 2009

Related U.S. Application Data

(63) Continuation of application No. PCT/JP2007/050702, filed on Jan. 18, 2007.

(51) Int. Cl.
*G06F 7/00* (2006.01)
*G06F 17/30* (2006.01)

(52) U.S. Cl. ........................................................ 707/737

(58) Field of Classification Search .................. 707/713, 707/999.003, 737
See application file for complete search history.

(56) References Cited

U.S. PATENT DOCUMENTS

| | | | | |
|---|---|---|---|---|
| 6,144,963 | A | 11/2000 | Tsuda | |
| 7,359,891 | B2 | 4/2008 | Nishino et al. | |
| 2002/0042792 | A1* | 4/2002 | Nishioka et al. | 707/5 |
| 2002/0111786 | A1* | 8/2002 | Sugeno et al. | 704/1 |
| 2003/0033333 | A1* | 2/2003 | Nishino et al. | 707/531 |
| 2007/0143176 | A1* | 6/2007 | Nong et al. | 705/14 |

FOREIGN PATENT DOCUMENTS

| | | |
|---|---|---|
| JP | 10-283365 | 10/1998 |
| JP | 2001-188375 | 7/2001 |
| JP | 2002-334106 | 11/2002 |
| JP | 2003-006195 | 1/2003 |
| JP | A 2003-6195 | 1/2003 |
| JP | 2004-206517 | 7/2004 |
| JP | A 2004-206517 | 7/2004 |
| JP | 2004-348554 | 12/2004 |
| JP | A 2004-348554 | 12/2004 |
| JP | 2006-031577 | 2/2006 |
| JP | 2006-079454 | 2/2006 |
| JP | A 2006-31577 | 2/2006 |
| JP | 2006-092368 | 4/2006 |
| JP | 2006-236262 | 9/2006 |
| JP | A 2006-236262 | 9/2006 |

OTHER PUBLICATIONS

Japanese Office Action issued in Japanese Application No. 2008-553929, mailed Dec. 21, 2010.
Nifty Corporation, “Shun word”, http://nifty.com/shun/, Retrieved Dec. 23, 2006 (with partial English translation).

* cited by examiner

*Primary Examiner* — Van Oberly
(74) *Attorney, Agent, or Firm* — Greer, Burns & Crain, Ltd

(57) ABSTRACT

A keyword management system for managing keywords used when a user terminal connected to a network accesses contents, includes a Burst value calculating unit that calculates a Burst value indicating an increase per unit time of a keyword, an overall Burst value calculating unit that calculates an overall Burst value by correcting the Burst value based on characteristics in the contents of the keyword corresponding to the Burst value, and an output controlling unit that extracts from the contents, a relevant keyword related to the keyword corresponding to the overall Burst value based on time series changes of the overall Burst value, and outputs the keyword and the relevant keyword associated with each other to the user terminal.

12 Claims, 11 Drawing Sheets

| KEYWORD | DATE AND TIME | DOCUMENT SOURCE ID | NEWS (BLOG) CONTENT | ... |
|---|---|---|---|---|
| KEYWORD A | 2006/11/11/11:10 | CN 001 | XXXX | ... |
| KEYWORD B | 2006/11/11/11:10 | CN 002 | XXXX | ... |
| ⋮ | ⋮ | ⋮ | ⋮ | ... |

| KEYWORD | DATE AND TIME | NUMBER OF SEARCHES (NUMBER OF UNIQUE USERS) | NUMBER OF HITS | AVERAGE NUMBER OF SEARCHES | BURST VALUE |
|---|---|---|---|---|---|
| A CORPORATION | 2006/11/11/16:00 | 111 | 1200000 | 90.5 | 5.8 |
| B CORPORATION | 2006/11/11/16:00 | 80 | 1000000 | 83.5 | 4.5 |
| C CORPORATION | 2006/11/11/16:00 | 90 | 950000 | 75 | 3.5 |
| ⋮ | ⋮ | ⋮ | ⋮ | ⋮ | ⋮ |

| MORPHEME | HOW TO READ | WORD CLASS | OTHER INFORMATION |
| --- | --- | --- | --- |
| A CORPORATION | - | - | - |
| B CORPORATION | - | - | - |
| C CORPORATION | - | - | - |

| KEYWORD | DATE AND TIME | DOCUMENT SOURCE ID | LOCALE | TITLE | ENHANCEMENT | LINK | CONTENT |
|---|---|---|---|---|---|---|---|
| A CORPORATION | 2006/11/11/16:00 | CN001 | 1, 15, 50 | 1 | 1 | 0 | 3 |
| | | CN002 | 2, 30, 45 | 0 | 0 | 0 | 4 |
| | | CN003 | 1, 20, 32 | 1 | 0 | 0 | 2 |
| ⋮ | ⋮ | ⋮ | ⋮ | ⋮ | ⋮ | ⋮ | ⋮ |
| LABORATORY | 2006/11/11/16:00 | CN001 | 10, 16, 45 | 0 | 0 | 0 | 3 |
| | | CN002 | 2, 34, 44 | 0 | 1 | 1 | 4 |
| | | CN003 | 1, 2, 3 | 1 | 0 | 0 | 4 |
| ⋮ | ⋮ | ⋮ | ⋮ | ⋮ | ⋮ | ⋮ | ⋮ |
| DEVELOPMENT | 2006/11/11/16:00 | CN001 | 1, 5, 14, 3448 | 1 | 0 | 0 | 5 |
| | | CN002 | 2, 44, 56 | 1 | 0 | 0 | 2 |
| | | CN003 | 5, 6, 34, 55 | 0 | 1 | 0 | 2 |
| ⋮ | ⋮ | ⋮ | ⋮ | ⋮ | ⋮ | ⋮ | ⋮ |

| KEYWORD | DATE AND TIME | TITLE | ENHANCEMENT | LINK | CONTENT | AVERAGE | BURST VALUE |
|---|---|---|---|---|---|---|---|
| A CORPORATION | 2006/11/11/16:00 | 10 | 20 | 5 | 40 | 10.5 | 20.3 |
| LABORATORY | 2006/11/11/16:00 | 5 | 3 | 1 | 3 | 5.5 | 1.5 |
| DEVELOPMENT | 2006/11/11/16:00 | 5 | 3 | 2 | 80 | 70.5 | 2.3 |

| KEYWORD | DATE AND TIME | SB(kwi) | CB(kwi) | $\alpha$(kwi) | TB(kwi) (OVERALL BURST VALUE) |
|---|---|---|---|---|---|
| A CORPORATION | 2006/11/11/16:00 | 5.8 | 20.3 | 2.5 | 40 |
| LABORATORY | 2006/11/11/16:00 | 1 | 3 | 1 | 3 |
| DEVELOPMENT | 2006/11/11/16:00 | 1 | 3 | 2 | 80 |

| KEYWORD | DATE AND TIME | TOPIC TYPE |
|---|---|---|
| A CORPORATION | 2006/11/11/16:00 | REPETITIVE |
| LABORATORY | 2006/11/11/16:00 | REPETITIVE |
| DEVELOPMENT | 2006/11/11/16:00 | REPETITIVE |

| KEYWORD (kwi) | CORRELATED KEYWORD (CO(kwi)) |
|---|---|
| A CORPORATION | SERVICE A, PERSONAL COMPUTER B |
| D CORPORATION | BATTERY C |

| KEYWORD (kwi) | CO-OCCURRING KEYWORD (RK(kwi)) |
|---|---|
| A CORPORATION | LABORATORY, DEVELOPMENT, ······ |
| D CORPORATION | GAME MACHINE, RELEASE |

| KEYWORD | DATE AND TIME | TB(kwi) | SUB(kwi) | TOPIC TYPE |
|---|---|---|---|---|
| A CORPORATION | 2006/11/11/16:00 | 40 | LABORATORY, DEVELOPMENT | REPETITIVE |
| D CORPORATION | 2006/11/11/16:00 | 1 | GAME MACHINE, RELEASE | REPETITIVE |

METHOD AND SYSTEM FOR KEYWORD MANAGEMENT

CROSS-REFERENCE TO RELATED APPLICATION(S)

This application is a continuation of PCT international application Ser. No. PCT/JP2007/50702 filed on Jan. 18, 2007 which designates the United States, the entire contents of which are incorporated herein by reference.

FIELD

The embodiment discussed herein is directed to a keyword management program, a keyword management system, and a keyword management method for managing keywords.

BACKGROUND

Recently, the Internet has been widely used and users utilize terminals connected to the Internet to obtain various types of information from the Internet. For example, when a user wishes to obtain information related to a certain keyword from the Internet, the user can obtain the information by using a search engine.

Further, even if the user does not know a specific keyword, the user can obtain diverse types of information such as news, topics, and recommended information selected by a service provider by accessing a portal site or a blog site managed by the service provider.

Many other services are provided through the Internet to the user who collects information. For example, "Shun word" by Nifty Corporation, [online], [Retrieved on Dec. 23, 2006], Website at <http://www.nifty.com/shun/> discloses a service to provide topical keywords to the user and prompt the user to search by the keywords. This service can provide the topical keywords to the user by ranking keywords searched for during a predetermined period and notifying the user of a result of the ranking.

Further, Japanese Laid-open Patent Publication No. 2006-31577 discloses a technique for setting an arrangement of information related to keywords searched for according to degrees of relationship between the keywords searched for and the information related to the keywords, thereby providing a more convenient information search to the user.

In the conventional techniques as described above, popular topics can be provided to the user; however, the reason why the provided topics are popular remains unknown.

Because information on the reason why the provided topic is popular is not provided to the user, the user has to perform search without knowing the reason. Then, the search hits a variety of information related to the topic (including information which is related to the topic though not related to the cause of its popularity). Thus, the user cannot utilize the topics conveniently in performing searches.

It is desirable to clarify the reason why the topics are popular in providing information on the topics to the user.

SUMMARY

According to an aspect of the invention, a keyword management system for managing keywords used when a user terminal connected to a network accesses contents includes: a Burst value calculating unit that calculates a Burst value indicating an increase per unit time of a keyword; an overall Burst value calculating unit that calculates an overall Burst value by correcting the Burst value based on characteristics in the contents of the keyword corresponding to the Burst value; and an output controlling unit that extracts from the contents, a relevant keyword related to the keyword corresponding to the overall Burst value based on time series changes of the overall Burst value, and outputs the keyword and the relevant keyword associated with each other to the user terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 4 is an example of a data configuration of a news/blog table;

FIG. 5 is an example of a data configuration of a search word table;

FIG. 6 is an example of a data configuration of a user dictionary table;

FIG. 7 is an example of a data configuration of a morphological-analysis-result management table;

FIG. 8 is an example of a data configuration of a Burst-calculation parameter table;

FIG. 9 is an example of a data configuration of an overall-Burst storage table;

FIG. 10 is an example of a data configuration of a topic-type management table;

FIG. 11 is an example of a data configuration of a correlated keyword table;

FIG. 12 is an example of a data configuration of a co-occurring keyword table;

FIG. 13 is an example of a data configuration of a final-result storage table;

DESCRIPTION OF EMBODIMENT(S)

Exemplary embodiments of a keyword management program, a keyword management system, and a keyword management method according to the present invention will be explained below in detail with reference to the accompanying drawings. The present invention is not limited to the embodiments.

Figure 1:
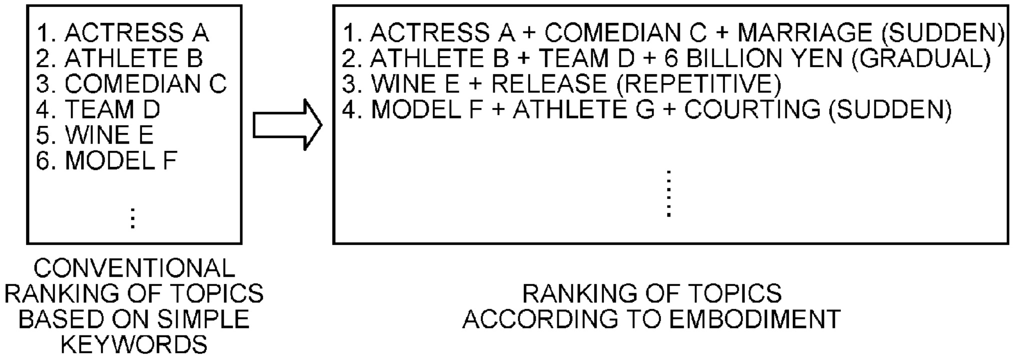
FIG. 1 is an explanatory diagram of a difference between a keyword management system according to a conventional technique and a keyword management system according to an embodiment of the present invention.

A feature of a keyword management system according to an embodiment of the present invention is first explained by comparing the same with a keyword management system according to a conventional technique. FIG. 1 explains a difference between the keyword management system according to the conventional technique and the keyword management system according to the present embodiment. In the conventional technique, as illustrated on the left side of FIG. 1, popular keywords are selected based on usage frequencies of keywords that are used when contents are accessed. The selected keywords are arranged in descending order of usage frequencies, and terminals of users (hereinafter, "user terminals") are notified of the selected keywords as topics (see the left side in FIG. 1).

However, in the conventional technique, the popular keywords are simply arranged in the order of usage frequencies. Therefore, the users cannot understand why these keywords are topics and cannot utilize these keywords conveniently in performing information searches.

On the other hand, the keyword management system according to the present embodiment calculates a Burst value indicating an increase per unit time in usages of each keyword which the user uses when accessing contents, and calculates an overall Burst value by correcting the calculated Burst value based on characteristics of each keyword corresponding to the Burst value in the contents. The keyword management system according to the present embodiment extracts keywords (hereinafter, "relevant keywords") related to keywords corresponding to the overall Burst value from the contents based on time series changes of the overall Burst value. The keyword management system according to the present embodiment then notifies the user terminals of information including the keywords and the relevant keywords associated with each other as topics (see the right side in FIG. 1).

In this way, the keyword management system according to the present embodiment notifies the users of a topic in the form of a keyword group including a set of a topical keyword and other keywords closely related to the topical keyword. Therefore, the users can understand why the topic is popular and utilize the topic conveniently in performing the information searches.

Figure 2:
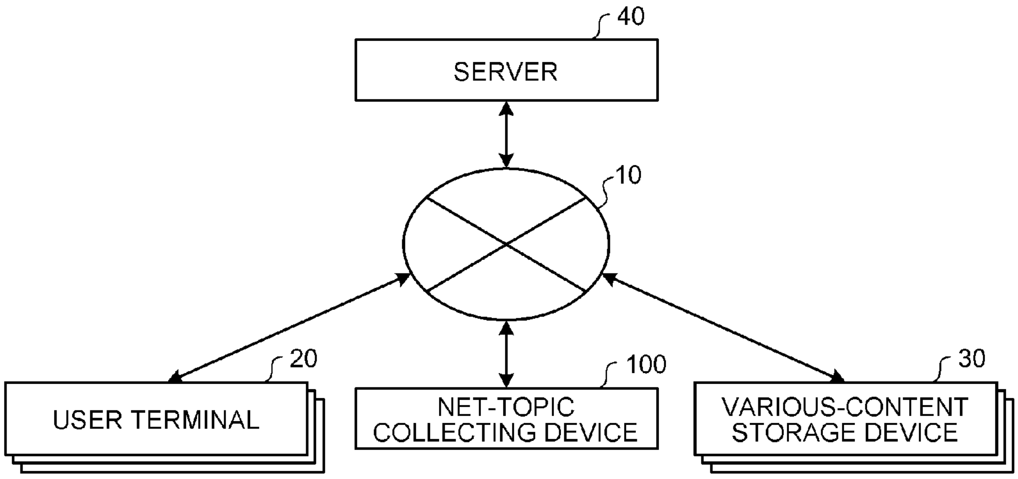
FIG. 2 is a system configuration diagram of the keyword management system according to the embodiment.

A configuration of the keyword management system according to the present embodiment is explained. FIG. 2 is a system configuration diagram of the keyword management system according to the present embodiment. As depicted in FIG. 2, the keyword management system according to the present embodiment includes a user terminal 20, a various-content storage device 30, a server 40, and a net-topic collecting device 100, which are connected via a network 10.

The user terminal 20 obtains a variety of information by using a portal site (including a search engine) operated by the server 40. To obtain a variety of information, the user terminal 20 receives a keyword from a user through an input device (not depicted in the drawings) and outputs the received keyword to the server 40.

The various-content storage device 30 stores therein a variety of contents (e.g., text contents such as news, blogs, BBS (bulletin board systems), share prices, weather, and fortune-telling) transmitted or received via the network. It is assumed that the contents include information of a date and time when the contents are created.

The server 40 operates a portal site and, when obtaining a keyword from the user terminal 20, searches the various-content storage device 30 for information related to the obtained keyword to output the retrieved information to the user terminal 20. The server 40 stores a history of keywords obtained from the user terminal 20 as search log information in a storage device (not depicted in the drawings). As the search log information, information of keywords searched for, search dates and times, the number of searches (duplicate searches performed by the same user are regarded as one search), and the number of hits of information corresponding to the keywords is stored in association with each other.

Figure 3:
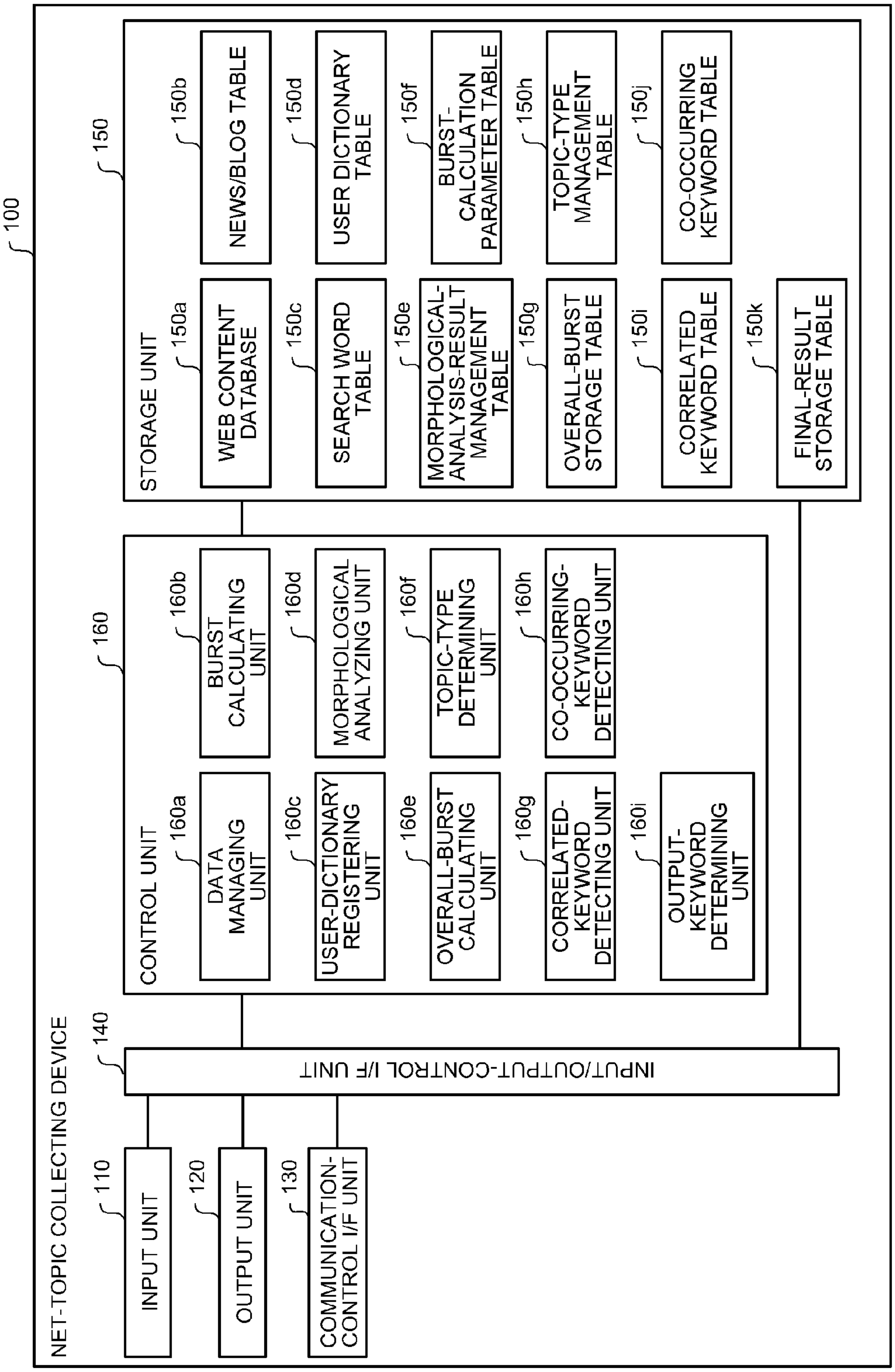
FIG. 3 is a functional block diagram of a configuration of a net-topic collecting device according to the embodiment.

The net-topic collecting device 100 associates a topical keyword and a relevant keyword(s) with each other to be outputted to the user terminal 20. A configuration of the net-topic collecting device 100 is explained. FIG. 3 is a functional block diagram of the configuration of the net-topic collecting device 100 according to the present embodiment. As illustrated in FIG. 3, the net-topic collecting device 100 includes an input unit 110, an output unit 120, a communication-control I/F unit 130, an input/output-control I/F unit 140, a storage unit 150, and a control unit 160.

Among these constituent elements, the input unit 110 inputs various types of information and is configured by a keyboard, a mouse, a microphone, and the like. A monitor described later (i.e., the output unit 120) works with the mouse to implement a pointing device function.

The output unit 120 outputs various types of information and is configured by a monitor (or a display, a touch panel), a speaker, and the like. The communication-control I/F unit 130 mainly controls communications among the user terminal 20, the various-content storage device 30, and the server 40. The input/output-control I/F unit 140 controls input and output of data by the input unit 110, the output unit 120, the communication-control I/F unit 130, the storage unit 150, and the control unit 160.

The storage unit 150 stores therein data and programs required for various processes by the control unit 160. The storage unit 150 includes following constituent elements particularly closely related to the present invention. As illustrated in FIG. 3, the storage unit 150 includes a Web content database 150*a*, a news/blog table 150*b*, a search word table 150*c*, a user dictionary table 150*d*, a morphological-analysis-result management table 150*e*, a Burst-calculation parameter table 150*f*, an overall-Burst storage table 150*g*, a topic-type management table 150*h*, a correlated keyword table 150*i*, a co-occurring keyword table 150*j*, and a final-result storage table 150*k*.

The Web content database 150*a* stores therein search log information obtained by the net-topic collecting device 100 from the server 40 and information of various contents (e.g., information of text contents such as news, blogs, BBSs, share prices, weather, and fortune-telling) obtained by the net-topic collecting device 100 from the various-content storage device 30. Each of the various pieces of content information is stored in association with unique document source ID (i.e., Identification).

In the news/blog table 150*b*, information of news or blogs (or BBSs) is classified (indexed) according to keywords, and dates and times when the news or blogs are released (or created). FIG. 4 is an example of a data configuration of the news/blog table 150*b*. As illustrated in FIG. 4, the news/blog table 150*b* contains a keyword, a date and time, a document source ID, and a content of news (blogs). The date and time indicates when the news or blog is released (or created). While the news/blog table 150*b* stores therein information of news and blogs in this example, the news/blog table 150*b* can also store therein other information (for example, BBSs and other contents).

The search word table 150*c* stores therein various types of information on keywords included in the search log information. FIG. 5 is an example of a data configuration of the search word table 150*c*. As illustrated in FIG. 5, the search word table 150*c* contains a keyword, a date and time, the number of searches, the number of hits, an average number of searches, and a Burst value.

The number of searches indicates the number of times the users searched by the keyword. For example, a first row in FIG. 5 indicates that the number of times the search by a keyword "A Corporation" is performed is 111.

The number of hits indicates the number of hits obtained when the search is performed by a keyword using a predetermined search engine. For example, the first row in FIG. 5 indicates that the number of hits for the keyword "A Corporation" is "1200000".

The average number of searches indicates an average number of searches per unit time calculated based on the number of searches by the keyword in the past. For example, the first row in FIG. 5 indicates that the average number of searches by the keyword "A Corporation" is "90.5".

The Burst value indicates an increase per unit time of the keyword used to access contents (i.e., inputted to the search engine by the users). In other words, the Burst value is a differential value of the search keyword that varies with time. The Burst value is calculated by a Burst calculating unit 160*b* described later.

Returning to the explanation of FIG. 3, the user dictionary table 150*d* stores therein information of morphemes used when a morphological analysis of the news or blogs is performed. FIG. 6 is an example of a data configuration of the user dictionary table 150*d*. As illustrated in FIG. 6, the user dictionary table 150*d* includes a morpheme, how to read, a word class, and other information.

The morphological-analysis-result management table 150*e* stores therein results of analyses of a keyword, i.e., morphemes extracted from the news or blogs. FIG. 7 is an example of a data configuration of the morphological-analysis-result management table 150*e*. As illustrated in FIG. 7, the morphological-analysis-result management table 150*e* contains a keyword, a date and time, a document source ID, a locale, a title, an enhancement, a link, and a content.

The document source ID indicates an identification number of a document including the corresponding keyword. For example, in FIG. 7, documents including the keyword "A Corporation" have identification numbers (i.e., document source IDs) of "CN001, CN002, CN003".

The locale indicates a location of the keyword in the document. For example, it is indicated that the keyword "A Corporation" is located at 1st, 15th, and 50th positions in the document having the document source ID "CN001".

The title indicates the number of keywords included in a document title. For example, it is indicated that the number of keyword "A Corporation" included in the title of the document having the document source ID "CN001" is one.

The enhancement indicates the number of keywords modified in the document (i.e., the number of keywords enhanced in boldface type or the like in the document). The link indicates the number of keywords linked in the document. The content indicates the number of keywords included in the document.

The Burst-calculation parameter table 150*f* stores therein information related to Burst values of the morphemes extracted from the news or blogs as a result of the morphological analysis. FIG. 8 is an example of a data configuration of the Burst-calculation parameter table 150*f*. As illustrated in FIG. 8, the Burst-calculation parameter table 150*f* includes a keyword, a date and time, a title, an enhancement, a link, a content, an average, and a Burst value.

The title, the enhancement, the link, and the content correspond to the title, the enhancement, the link, and the content explained with reference to FIG. 7, respectively. The average and the Burst value correspond to the average number of searches and the Burst value explained with reference to FIG. 5. The average and the Burst value in FIG. 8 are for the keyword in the news and blogs, whereas the average number of searches and the Burst value in FIG. 5 are for the keyword in the search log information.

The overall-Burst storage table 150*g* stores therein overall Burst values corresponding to respective keywords. FIG. 9 is an example of a data configuration of the overall-Burst storage table 150*g*. As illustrated in FIG. 9, the overall-Burst storage table 150*g* includes a keyword, a date and time, SB(kwi), CB(kwi), α(kwi), and TB(kwi).

Among these, SB(kwi) indicates a Burst value of a keyword included in the search log information, and SB(kwi) is calculated based on each information stored in the search word table 150*c*. Further, CB(kwi) indicates a Burst value of a keyword included in news or blogs, and CB(kwi) is calculated based on each information stored in the Burst-calculation parameter table 150*f*.

A coefficient α(kwi) is used to calculate an overall Burst value. TB(kwi) indicates an overall Burst value corresponding to a keyword. The overall Burst value is calculated by an overall-Burst calculating unit 160*e* described later. It is assumed that the overall-Burst storage table 150*g* stores therein SB(kwi), CB(kwi), α(kwi) and TB(kwi) of a keyword at various points in time.

The topic-type management table 150*h* is used to classify keywords into plural topic types previously prepared. FIG. 10 is an example of a data configuration of the topic-type management table 150*h*. As illustrated in FIG. 10, the topic-type management table 150*h* includes a keyword, a date and time, and a topic type.

The topic type indicates a characteristic of temporal changes of a search keyword used by the users. For example, when the topic type of a keyword is "repetitive", it indicates that the number of searches by the keyword repeatedly increases and decreases. There are other topic types such as "gradual" and "sudden". The topic type "gradual" indicates that the number of searches by the keyword gently increases with time. The topic type "sudden" indicates that the number of searches by the keyword increases sharply for a predetermined period of time.

The correlated keyword table 150*i* stores therein keywords, and keywords correlated with these keywords (i.e., correlated keyword), in association with each other. FIG. 11 is an example of a data configuration of the correlated keyword table 150*i*. As illustrated in FIG. 11, the correlated keyword table 150*i* includes a keyword and a correlated keyword, and the keyword and the correlated keyword are associated with each other. For example, in a first row of FIG. 11, the keyword "A Corporation" is associated with correlated keywords "service A" and "personal computer B".

The co-occurring keyword table 150*j* stores therein keywords, and keywords having co-occurrence relations with these keywords (i.e., keywords occurring with the corresponding keywords in documents; hereinafter, "co-occurring keywords"), being associated with each other. FIG. 12 is an example of a data configuration of the co-occurring keyword table 150*j*. As illustrated in FIG. 12, the co-occurring keyword table 150*j* includes a keyword and a co-occurring keyword, and the keyword and the co-occurring keyword are associated with each other. For example, in a first row of FIG. 12, the keyword "A Corporation" is associated with co-occurring keywords "laboratory" and "development".

The final-result storage table 150*k* stores therein information to be outputted to the user terminal 20. FIG. 13 is an example of a data configuration of the final-result storage table 150*k*. As illustrated in FIG. 13, the final-result storage table 150*k* includes a keyword, a date and time, TB(kwi), SUB(kwi), and a topic type. Among these, SUB(kwi) indicates a correlated keyword or a co-occurring keyword outputted to the user terminal 20 together with the corresponding keyword. The final-result storage table 150*k* stores therein keywords in descending order of the overall Burst values TB(kwi).

Returning to the explanation of FIG. 3, the control unit 160 includes an internal memory that stores therein programs and control data specifying various processing procedures, and performs various processes according to the programs and the control data. The control unit 160 includes following constituent elements particularly closely related to the present invention. As illustrated in FIG. 3, the control unit 160 includes a data managing unit 160*a*, the Burst calculating unit 160*b*, a user-dictionary registering unit 160*c*, a morphological analyzing unit 160*d*, the overall-Burst calculating unit 160*e*, a topic-type determining unit 160*f*, a correlated-keyword detecting unit 160*g*, a co-occurring-keyword detecting unit 160*h*, and an output-keyword determining unit 160*i*.

The data managing unit 160*a* obtains the search log information from the server 40 to store the search log information in the Web content database 150*a*, and obtains various content information from the various-content storage device 30 to store the information in the Web content database 150*a*. When collecting contents whose release date and time are assured, the data managing unit 160*a* can apply a technique as disclosed in the conventional art (Japanese Laid-open Patent Publication No. 2006-236262).

The data managing unit 160*a* also indexes news and blogs stored in the Web content database 150*a* to create the news/blog table 150*b* (see FIG. 4). Any keyword can be selected from news or blogs to index the news or blogs so long as the news or the blog can be uniquely identified based on the date and time and the selected keyword.

Further, the data managing unit 160*a* also creates the search word table 150*c* based on the search log information stored in the Web content database 150*a* (see FIG. 5). When creating the search word table 150*c*, the data managing unit 160*a* calculates an average number of searches by a keyword based on the number of past searches included in the search log information, and stores the calculated average number of searches in the search word table 150*c*.

The Burst calculating unit 160*b* calculates a Burst value based on the search word table 150*c* or the Burst-calculation parameter table 150*f*. A case that the Burst calculating unit 160*b* calculates a Burst value based on the search word table 150*c* is explained first. As described above, the Burst value indicates an amount of increase per unit time of search keyword used by the users. The Burst value can be calculated by any method. For example, the Burst value can be calculated by Formula (1).

$$AT_t(W_i)1 = \frac{UU_t(W_i)\times\left(UU_t(W_i) - \frac{C_{t1}}{t-1}\sum_{k=1}^{t-1} UU_k(W_i)\right)}{\frac{C_{t1}}{t-1}\sum_{k=1}^{t-1} UU_k(W_i)} \quad (1)$$

Respective items of Formula (1) are explained. In Formula (1), $UU_t(W_1)$ denotes the number of persons that use a keyword (wi) at time t, and $C_{t1}$ denotes a correction value for $UU_t(W_i)$. A Burst value $AT_t(W_i)$ 1 at time t can be calculated by using Formula (1). The denominator of Formula (1) corresponds to the average number of searches in the search word table 150*c*, and $UU_t(W_i)$ in Formula (1) corresponds to the number of searches in the search word table 150*c*. The Burst calculating unit 160*b* stores the Burst value $AT_t(W_i)$1 in the Burst value field of the search word table 150*c* in association with the corresponding keyword.

A case that the Burst calculating unit 160*b* calculates a Burst value based on the Burst-calculation parameter table 150*f* is explained. In this case, the Burst value can be calculated by Formula (2), for example.

$$AT_t(W_i)2 = \frac{F_t(W_i)\times\left(F_t(W_i) - \frac{C_{t2}}{t-1}\sum_{k=1}^{t-1} F_k(W_i)\right)}{\frac{C_{t2}}{t-1}\sum_{k=1}^{t-1} F_k(W_i)} \quad (2)$$

Respective items of Formula (2) are explained. In Formula (2), $F_t(W_i)$ denotes a frequency of a keyword included in a content released at time t, and $C_{t2}$ denotes a correction value for $F_t(W_i)$. A Burst value $AT_t(W_i)$2 at time t can be calculated by using Formula (2). The denominator of Formula (2) corresponds to the average in the Burst-calculation parameter table 150*f*, and $F_t(W_i)$ in Formula (2) corresponds to the content in the Burst-calculation parameter table 150*f*. The Burst calculating unit 160*b* stores the Burst value $AT_t(W_i)$2 in the Burst value field of the Burst-calculation parameter table 150*f* in association with the corresponding keyword.

The user-dictionary registering unit 160*c* searches for keywords having the Burst values that are stored in the Burst value field and equal to or higher than a threshold based on the information stored in the search word table 150*c*, and stores the retrieved keywords in the user dictionary table 150*d* (see FIG. 6).

The morphological analyzing unit 160*d* performs a morphological analysis of the text content described in the news (blogs) content field of the news/blog table 150*b* or the information stored in the Web content database 150*a*, by using keywords described in the morpheme field of the user dictionary table 150*d*. The morphological analyzing unit 160*d* stores a result of the morphological analysis in the morphological-analysis-result management table 150*e*.

The morphological analyzing unit 160*d* counts keywords included in titles, enhanced keywords, linked keywords, and keywords included in news or blogs using morphemes (keywords) obtained from the morphological analysis result, based on the text content described in the news (blogs) content field of the news/blog table 150*b* or the information stored in the Web content database 150*a*.

The morphological analyzing unit 160*d* associates the counted numbers with the corresponding keywords and stores in the title field, the enhancement field, the link field, and the content field of the morphological-analysis-result management table 150*e*. The morphological analyzing unit 160*d* also stores the document source ID and the locale information in the morphological-analysis-result management table 150*e*.

The morphological analyzing unit 160*d* also creates the Burst-calculation parameter table 150*f* (see FIG. 8) based on the morphemes (keywords) obtained from the morphological analysis result and the information stored in the Web content database 150*a* or the news/blog table 150*b*. The morphological analyzing unit 160*d* calculates an average number of searches by a keyword per unit time based on the number of searches by the keyword included in the information stored in the Web content database 150*a* or the news/blog table 150*b*. The morphological analyzing unit 160*d* stores the calculated average number of searches in the average field of the Burst-calculation parameter table 150*f*.

The overall-Burst calculating unit 160*e* calculates an overall Burst value corresponding to a keyword. As a specific process performed by the overall-Burst calculating unit 160*e*, an overall Burst value TB(kwi) corresponding to a keyword can be calculated as follows:

$$TB(\text{kwi}) = SB(\text{kwi}) \times CB(\text{kwi}) + \alpha(\text{kwi})$$

To explain the respective items, SB(kwi) denotes a Burst value (corresponding to a keyword) stored in the Burst value field of the search word table 150_c_, and CB(kwi) denotes a Burst value (corresponding to the keyword) stored in the Burst value field of the Burst-calculation parameter table 150_f_.

The value α(kwi) is calculated from T(kwi) indicating the number of keywords stored in the title field of the Burst-calculation parameter table 150_f_, L(kwi) indicating the number of keywords stored in the enhancement field, and E(kwi) indicating the number of keywords stored in the link field. Specifically, the value α(kwi) is calculated as follows:

$$\alpha(\mathrm{kwi})=\beta\times(T(\mathrm{kwi})+L(\mathrm{kwi})+E(\mathrm{kwi}))$$

In this formula, β is a coefficient for balancing the overall Burst value.

The overall-Burst calculating unit 160_e_ associates the calculated overall Burst value (TB(kwi)) with the corresponding keyword to be stored in the overall-Burst storage table 150_g_ (see FIG. 9). The overall-Burst calculating unit 160_e_ previously registers values of SB(kwi), CB(kwi), and α(kwi) corresponding to each keyword in the overall-Burst storage table 150_g_ based on the Burst-calculation parameter table 150_f_. When SB(kwi) is 0, the overall-Burst calculating unit 160_e_ registers 1 instead of 0. Similarly, when CB(kwi) is 0, the overall-Burst calculating unit 160_e_ registers 1 instead of 0.

The topic-type determining unit 160_f_ determines a topic type (repetitive, gradual, or sudden) corresponding to a keyword and stores a result of the determination in the topic-type management table with respect to each keyword. Specifically, the topic-type determining unit 160_f_ detects keywords having the overall Burst values that are stored in the TB(kwi) field of the overall-Burst storage table 150_g_ and equal to or higher than a threshold.

The topic-type determining unit 160_f_ calculates time series changes in the overall Burst value corresponding to the detected keyword for a past certain period. The topic-type determining unit 160_f_ then calculates a differential value from past time t−1 to time t (a value corresponding to a clock time on a certain date is substituted for t) at plural points in time, and determines a topic type based on the differential value at each point in time. The time series changes in the overall Burst value for the past certain period can be specified by an approximate expression based on a relation between the overall Burst value and the date and time for the past certain period.

When the differential value at each point in time has repeatedly become positive and negative n or more times, the topic-type determining unit 160_f_ determines the topic type of the keyword as "repetitive". When the differential value at each point in time has been positive m or more times in a row for a predetermined period or longer, the topic-type determining unit 160_f_ determines the topic type of the keyword as "gradual". When the differential value at each point in time has been positive m times in a row for less than the predetermined period, the topic-type determining unit 160_f_ determines the topic type of the keyword as "sudden".

The correlated-keyword detecting unit 160_g_ detects a group of keywords having correlation coefficients equal to or higher than a predetermined value using the keywords having the overall Burst values equal to or higher than the threshold. Specifically, the correlated-keyword detecting unit 160_g_ extracts keywords having the overall Burst values TB(kwi) equal to or higher than a threshold T based on the overall-Burst storage table 150_g_.

The correlated-keyword detecting unit 160_g_ calculates a correlation coefficient using the overall Burst value TB(kwi) of each of the extracted keywords. The correlation coefficient can be calculated by any method. For example, the correlation coefficient can be calculated by Formula (3).

$$\frac{\sum_{i=1}^{n}(x_i-\bar{x})(y_i-\bar{y})}{\sqrt{\sum_{i=1}^{n}(x_i-\bar{x})^2}\sqrt{\sum_{i=1}^{n}(y_i-\bar{y})^2}} \qquad (3)$$

To explain the respective items of Formula (3), $x_i$ corresponds to the overall Burst value TB(kwi) of a keyword and $y_i$ corresponds to an overall Burst value (kwj) of a keyword as a comparison target with respect to the correlation coefficient.

The correlated-keyword detecting unit 160_g_ extracts a group of keywords having the correlation coefficients for a keyword, which are equal to or higher than the predetermined value, using Formula (3), and stores the extracted group of keywords in the correlated keyword table 150_i_ as correlated keywords CO(kwi). The result stored in the first row of FIG. 11 indicates that a correlation coefficient between the overall Burst value TB(kwi) of the keyword "A Corporation" and the overall Burst value TB(kwj) of a correlated keyword "service A" is equal to or higher than the predetermined value. Similarly, it is found that a correlation coefficient between the overall Burst value TB(kwi) of the keyword "A Corporation" and the overall Burst value TB(kwj) of a correlated keyword "personal computer B" is equal to or higher than the predetermined value.

The co-occurring-keyword detecting unit 160_h_ extracts keywords that appear together (co-occur) with the keywords having the overall Burst values equal to or higher than the threshold in documents, as co-occurring keywords.

Specifically, the co-occurring-keyword detecting unit 160_h_ extracts keywords having the overall Burst values TB(kwi) equal to or higher than the threshold T based on the overall-Burst storage table 150_g_. The co-occurring-keyword detecting unit 160_h_ identifies locales (locations in documents) of the extracted keywords based on the extracted keywords and the morphological-analysis-result management table 150_e_.

The co-occurring-keyword detecting unit 160_h_ extracts m words (i.e., keywords) before and after the locale value as co-occurring keywords RK(kwi) based on the identified locale and the Web content database 150_a_ or the news/blog table 150_b_. The co-occurring-keyword detecting unit 160_h_ associates the extracted co-occurring keywords with the corresponding keyword to be stored in the co-occurring keyword table 150_j_. The co-occurring-keyword detecting unit 160_h_ performs this process also for other document source IDs.

When storing the co-occurring keywords in the co-occurring keyword table 150_j_, the co-occurring-keyword detecting unit 160_h_ stores the co-occurring keywords in descending order of frequencies of the co-occurring keywords in the documents. In the example illustrated in the first row of FIG. 12, the co-occurring keywords are stored in the order of laboratory, development, . . . , which means that a frequency of the co-occurring keyword "laboratory" co-occurring with the keyword "A Corporation" in the document is higher than that of "development".

The output-keyword determining unit 160_i_ creates a group of keywords to be outputted to the user terminal 20 (i.e., the information to be stored in the final-result storage table 150_k_), and outputs the created group of keywords to the user terminal 20. Specifically, the output-keyword determining unit

160*i* searches the news/blog table 150*b* based on a search condition "keyword (kwi)& correlated keywords CO(kwi)& co-occurring keywords RK(kwi)& date and time".

When the number of hits in this search condition is one or more, the output-keyword determining unit 160*i* stores the keyword, the date and time, the overall Burst value TB(kwi), SUB(kwi), and the topic type of the keyword corresponding to the search condition in the final-result storage table 150*k*. As SUB(kwi), the correlated keywords CO(kwi) and the co-occurring keywords RK(kwi) included in the search condition are stored. The output-keyword determining unit 160*i* stores the topic type of the keyword in the final-result storage table 150*k* based on the topic-type management table 150*h*. The output-keyword determining unit 160*i* stores the keywords in the final-result storage table 150*k* in the descending order of the overall Burst values.

When the number of hits obtained on the search condition is zero, the output-keyword determining unit 160*i* eliminates a correlated keyword CO(kwi) or a co-occurring keyword RK(kwi) having a low frequency from the search condition, and searches again the news/blog table 150*b*. The output-keyword determining unit 160*i* performs resetting of the search condition (i.e., performs setting to eliminate a correlated keyword CO(kwi) or a co-occurring keyword RK(kwi) having a low frequency from the search condition) and repeatedly performs the search until the number of hits obtained on the search condition becomes one or more.

The output-keyword determining unit 160*i* then refers to the topic type field of the final-result storage table 150*k* to extract keywords of the sudden type. The output-keyword determining unit 160*i* searches the news/blog table 150*b* under a new search condition of "extracted keywords (kwi)& CO(kwi)& RK(kwi)", in which a date and time is not included, to determine whether the number of hits is larger than one. When determining that the number of hits is larger than one, the output-keyword determining unit 160*i* deletes the topic type "sudden" of the corresponding keywords. Otherwise, the output-keyword determining unit 160*i* keeps the topic type unchanged.

Figure 14:
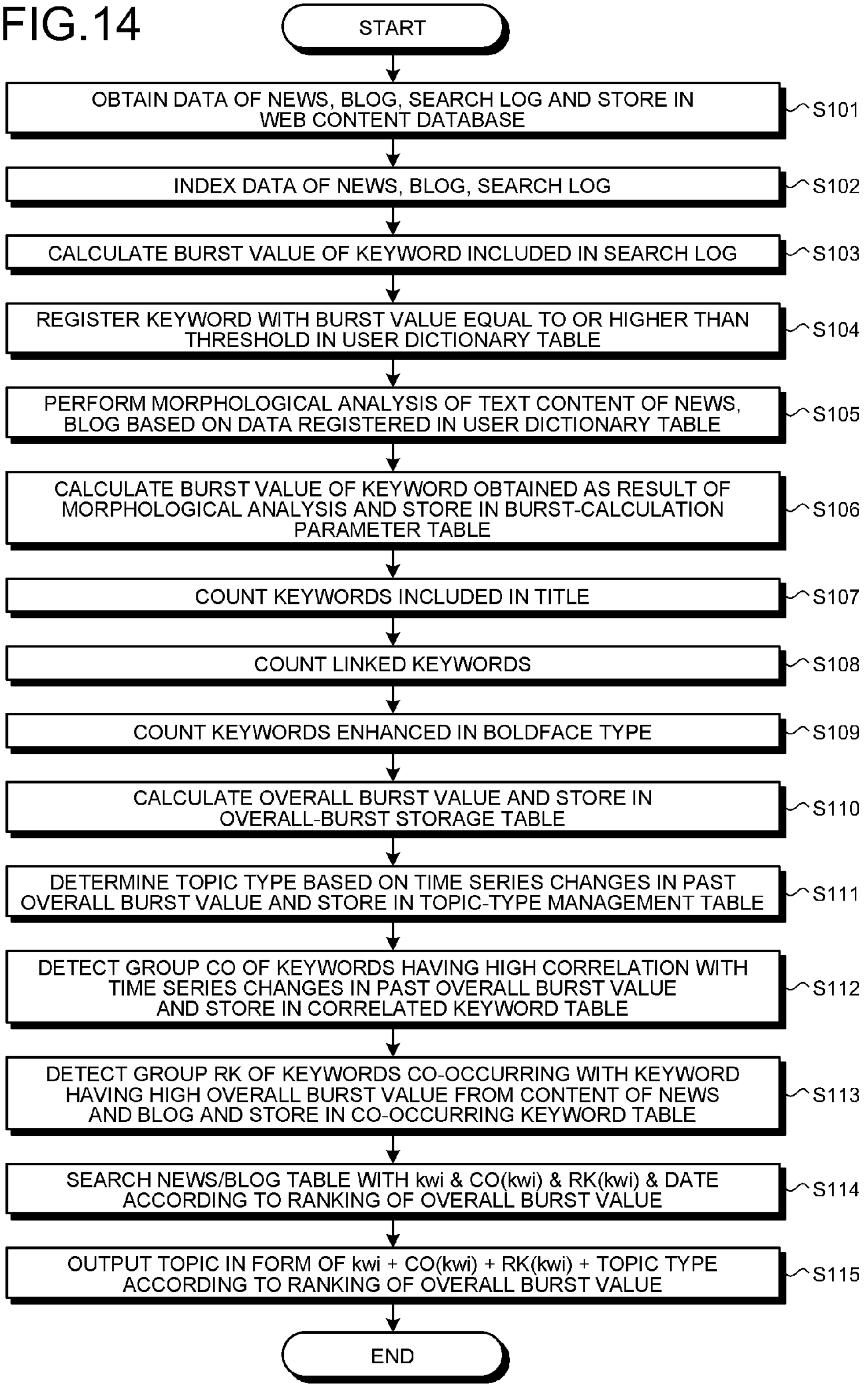
FIG. 14 is a flowchart of a process procedure performed by the net-topic collecting device according to the embodiment.

A process performed by the net-topic collecting device 100 according to the present embodiment is explained below. FIG. 14 is a flowchart of a process procedure performed by the net-topic collecting device 100 according to the present embodiment. As illustrated in FIG. 14, in the net-topic collecting device 100, the data managing unit 160*a* obtains information of news, blogs, and search logs from the various-content storage device 30 and the server 40, and stores the obtained information in the Web content database 150*a* (Step S101).

The data managing unit 160*a* indexes the data stored in the Web content database 150*a* to create the news/blog table 150*b* and the search word table 150*c* (Step S102). The Burst calculating unit 160*b* calculates the Burst values of the keywords included in the search word table 150*c* (Step S103).

The user-dictionary registering unit 160*c* then registers keywords having the Burst values equal to or higher than the threshold in the user dictionary table 150*d* (Step S104). The morphological analyzing unit 160*d* performs a morphological analysis of text content of news or blogs based on the data registered in the user dictionary table 150*d* (Step S105). The Burst calculating unit 160*b* calculates Burst values of keywords that are obtained as a result of the morphological analysis, and stores the calculated Burst values in the Burst-calculation parameter table 150*f* (Step S106).

A morphological analyzing unit 106*d* counts keywords included in titles (Step S107), counts linked keywords (Step S108), and counts keywords enhanced in boldface type or the like (Step S109).

The overall-Burst calculating unit 160*e* calculates an overall Burst value based on the Burst-calculation parameter table 150*f*, and stores the calculated overall Burst value in the overall-Burst storage table 150*g* (Step S110). The topic-type determining unit 160*f* determines a topic type based on time series changes in the past overall Burst value and stores the determined topic type in the topic-type management table 150*h* (Step S111).

The correlated-keyword detecting unit 160*g* then detects a group CO of keywords having high correlation (i.e., having correlation coefficients equal to or higher than the threshold) with the time series changes in the past overall Burst value, and stores the detected group in the correlated keyword table 150*i* (Step S112). The co-occurring-keyword detecting unit 160*h* detects a group of keywords RK co-occurring with the keywords having high overall Burst values (equal to or higher than the threshold) from the contents of the news and blogs, and stores the detected group in the co-occurring keyword table 150*j* (Step S113).

The output-keyword determining unit 160*i* then searches the news/blog table 150*b* under the search condition of "keyword (kwi)& correlated keywords CO(kwi)& co-occurring keywords RK(kwi)& date and time (Date)" according to ranking of the overall Burst values (in descending order of the overall Burst values) (Step S114). The output-keyword determining unit 160*i* outputs topics to the user terminal 20 in a form of "keyword (kwi)+correlated keywords CO(kwi)+co-occurring keywords RK(kwi)+topic type" according to the ranking of the overall Burst values (Step S115).

In this way, the output-keyword determining unit 160*i* outputs the topics to the user terminal 20 in the form of "keyword (kwi)+correlated keywords CO(kwi)+co-occurring keywords RK(kwi)+topic type". Therefore, the user can obtain popular topics and also can easily know why these topics are popular.

As described above, in the keyword management system according to the present embodiment, the net-topic collecting device 100 calculates a Burst value indicating an increase of a keyword per unit time, and calculates an overall Burst value based on the calculated Burst value and characteristics in the contents of the keyword (for example, the number of keywords included in titles, the number of linked keywords, and the number of enhanced keywords) corresponding to the calculated Burst value. The net-topic collecting device 100 then extracts from the contents, relevant keywords (correlated keywords and co-occurring keywords) related to the keyword corresponding to the overall Burst value based on time series changes of the overall Burst value, and outputs information including the keyword and the relevant keywords associated with each other as topics to the user terminal 20. Therefore, the information of the popular topics can be notified to the users while clarifying why the topics are popular.

The net-topic collecting device 100 according to the present embodiment outputs the topic information together with the topic type to the user terminal. Therefore, the user can easily know how these topics have become popular.

In the net-topic collecting device 100 according to the present embodiment, the morphological analyzing unit 160*d* performs a morphological analysis of news or blogs using morphemes stored in the user dictionary table 150*d*. Therefore, segmentation of unknown words can be performed more correctly.

Among the respective processes described in the embodiment, all or a part of the processes explained as being performed automatically can be performed manually, or all or a part of the processes explained as being performed manually can be performed automatically by a known method. In addition, the process procedures, control procedures, specific names, and information including various kinds of data and parameters described in the above embodiment can be arbitrarily changed unless otherwise specified.

The configuration of the keyword management system depicted in FIG. 2 and the constituent elements of the net-topic collecting device 100 depicted in FIG. 3 are functionally conceptual, and physically the same configuration is not always necessary. That is, the specific mode of dispersion and integration of the devices are not limited to the illustrated ones and all or a part thereof can be functionally or physically distributed or integrated in an arbitrary unit, according to various kinds of load and the status of use. All or an arbitrary part of processing functions performed by the respective devices can be realized by a CPU or a program analyzed and executed by the CPU, or can be realized as hardware by a wired logic.

Figure 15:
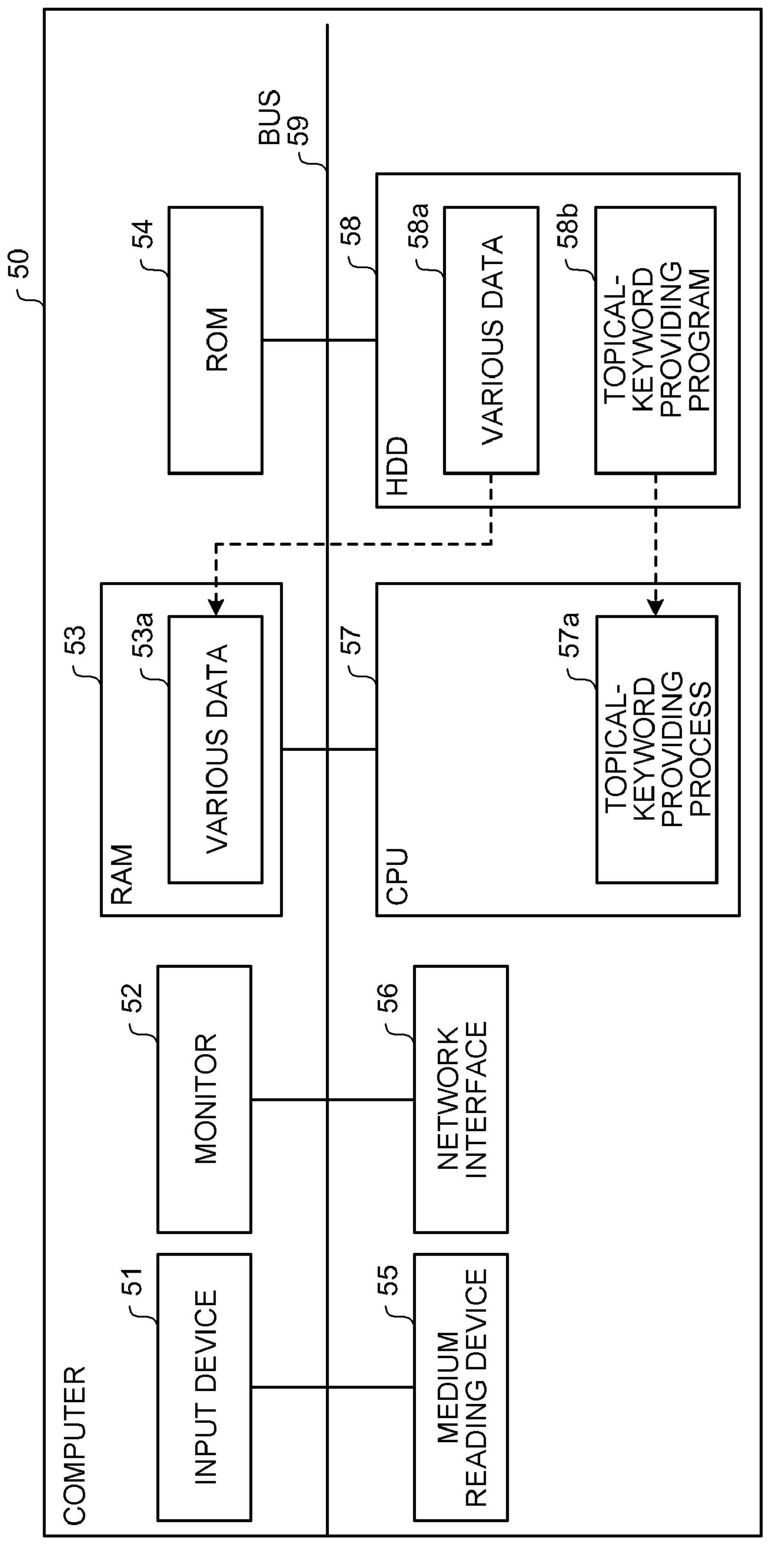
FIG. 15 depicts a hardware configuration of a computer configuring the net-topic collecting device of FIG. 3.

FIG. 15 depicts a hardware configuration of a computer that constitutes the net-topic collecting device 100 as depicted in FIG. 3. A computer 50 includes an input device 51 that receives input of data from a user, a monitor 52, a random access memory (RAM) 53, a read only memory (ROM) 54, a medium reading device 55 that reads a program from a recording medium in which various programs are recorded, a network interface 56 for exchanging data with another computer via a network, a CPU 57, and a hard disk drive (HDD) 58, which are connected through a bus 59.

The HDD 58 stores therein a topical-keyword providing program 58*b* that executes the same function as that of the net-topic collecting device 100 described above. When the CPU 57 reads the topical-keyword providing program 58*b* from the HDD 58 and implements the topical-keyword providing program 58*b*, a topical-keyword providing process 57*a* that executes the functions of the functional units of the net-topic collecting device 100 is started. The topical-keyword providing process 57*a* corresponds to the data managing unit 160*a*, the Burst calculating unit 160*b*, the user-dictionary registering unit 160*c*, the morphological analyzing unit 160*d*, the overall-Burst calculating unit 160*e*, the topic-type determining unit 160*f*, the correlated-keyword detecting unit 160*g*, the co-occurring-keyword detecting unit 160*h*, and the output-keyword determining unit 160*i* as depicted in FIG. 3.

The HDD 58 also stores therein various data 58*a* corresponding to the data stored in the storage unit 150 of the net-topic collecting device 100. The various data 58*a* correspond to the Web content database 150*a*, the news/blog table 150*b*, the search word table 150*c*, the user dictionary table 150*d*, the morphological-analysis-result management table 150*e*, the Burst-calculation parameter table 150*f*, the overall-Burst storage table 150*g*, the topic-type management table 150*h*, the correlated keyword table 150*i*, the co-occurring keyword table 150*j*, and the final-result storage table 150*k* as depicted in FIG. 3.

The CPU 57 stores the various data 58*a* in the HDD 58. The CPU 57 also reads the various data 58*a* from the HDD 58 to store the various data 58*a* in the RAM 53, and associates information of topics attracting attention with relevant keywords by using various data 53*a* stored in the RAM 53, to be outputted to the user terminal 20.

According to the embodiment, the Burst value indicating an increase per unit time of each keyword is calculated, the overall Burst value is calculated by correcting the calculated Burst value based on characteristics in the contents of the keyword corresponding to the Burst value, and the relevant keywords related to keywords corresponding to the overall Burst value are extracted from the contents based on time series changes of the overall Burst value, and the keywords and the relevant keywords that are associated with each other are outputted to the user terminal. Therefore, the user can easily understand why the topical keywords are popular from the topical keywords and the relevant keywords.

According to the embodiment, the morphological analysis of a text included in the contents is performed based on a keyword having the Burst value equal to or higher than the threshold, and the Burst value of a keyword obtained as a result of the morphological analysis result is further calculated. Therefore, the topical keywords can be extracted more correctly.

According to the embodiment, the keywords corresponding to the overall Burst value are classified into plural types previously prepared based on the time series changes of the overall Burst value. Therefore, the user can easily understand how the keywords have become popular.

According to the embodiment, the overall Burst value is corrected based on the characteristics in the contents of the keyword including the number of keywords included in titles, the number of linked keywords, and the number of keyword modified. Therefore, the topical keywords can be extracted more precisely.

According to the embodiment, the keyword correlated to the time series changes of the overall Burst value is extracted as the relevant keyword. Therefore, the user can easily understand why the topical keywords are popular from the topical keywords and the relevant keywords.

According to the embodiment, the keyword co-occurring with a keyword having the overall Burst value equal to or higher than the threshold in the text of the contents is further extracted as the relevant keyword. Therefore, the user can easily understand why the topical keywords are popular from the topical keywords and the relevant keywords, and accordingly can use the keywords more conveniently in performing the information searches.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer readable non-transitory storage medium storing a keyword management program which makes a computer perform a keyword management method for managing keywords used when a user terminal connected to a network accesses contents, the keyword management program makes the computer perform the method comprising:

calculating a first Burst value indicating an increase per unit time of a keyword;

performing a morphological analysis in which a computer extracts the same morpheme as a morpheme stored in a user dictionary table from the contents and obtains attribute information corresponding to the extracted morpheme from a morphological-analysis-result management table, of a text included in the contents based on a keyword having the first Burst value equal to or higher than a threshold;

calculating a second Burst value indicating an increase per unit time of a keyword for the keyword obtained as a result of the morphological analysis;

calculating an overall Burst value using the first Burst value and the second Burst value by correcting the first Burst value based on characteristics in the contents of the keyword corresponding to the first Burst value;

extracting from the contents, a relevant keyword related to the keyword corresponding to the overall Burst value based on time series changes of the overall Burst value, and outputting the keyword and the relevant keyword associated with each other to the user terminal; and classifying the keyword corresponding to the overall Burst value into one of plural, previously-prepared types based on the time series changes of the overall Burst value, by calculating time series changes in the overall Burst value for a past certain period calculating a differential value of the calculated time series changes at a plurality of points in time, and determining a type based on the differential value at each point in time, wherein when outputting the keyword and the relevant keyword associated with each other to the user terminal further outputting a classification result obtained as a result of keyword classification to the user terminal.

2. The computer readable non-transitory storage medium according to claim 1, wherein the characteristics in the contents of the keyword include the number of keywords included in titles, the number of linked keywords, and the number of keywords modified in the contents.

3. The computer readable non-transitory storage medium according to claim 1, wherein when extracting the relevant keyword, extracting a keyword correlated to the time series changes of the overall Burst value as the relevant keyword.

4. The computer readable non-transitory storage medium according to claim 3, wherein when extracting the relevant keyword, further extracting a keyword co-occurring in the text of the contents with a keyword having the overall Burst value equal to or higher than a threshold, as the relevant keyword.

5. A keyword management system for managing keywords used when a user terminal connected to a network accesses contents, comprising:

a first Burst value calculating unit that calculates a first Burst value indicating an increase per unit time of a keyword;

a morphological analyzing unit that performs a morphological analysis in which a computer extracts the same morpheme as a morpheme stored in a user dictionary table from the contents and obtains attribute information corresponding to the extracted morpheme from a morphological-analysis-result management table, of a text included in the contents based on a keyword having the first Burst value equal to or higher than a threshold;

a second Burst value calculating unit that calculates a second Burst value indicating an increase per unit time of a keyword for the keyword obtained as a result of the morphological analysis;

an overall Burst value calculating unit that calculates an overall Burst value using the first Burst value and the second Burst value by correcting the first Burst value based on characteristics in the contents of the keyword corresponding to the first Burst value;

an output controlling unit that extracts from the contents, a relevant keyword related to the keyword corresponding to the overall Burst value based on time series changes of the overall Burst value, and outputs the keyword and the relevant keyword associated with each other to the user terminal; and a classifying unit that classifies the keyword corresponding to the overall Burst value into one of plural, previously-prepared types based on the time series changes of the overall Burst value, by calculating time series changes in the overall Burst value for a past certain period, calculating a differential value of the calculated time series changes at a plurality of points in time, and determining a type based on the differential value at each point in time, wherein the output controlling unit further outputs a classification result obtained as a result of classification by the classifying unit.

6. The keyword management system according to claim 5, wherein the characteristics in the contents of the keyword include the number of keywords included in titles, the number of linked keywords, and the number of keywords modified in the contents.

7. The keyword management system according to claim 5, wherein the output controlling unit extracts a keyword correlated to the time series changes of the overall Burst value as the relevant keyword.

8. The keyword management system according to claim 7, wherein the output controlling unit further extracts a keyword co-occurring in the text of the contents with a keyword having the overall Burst value equal to or higher than a threshold, as the relevant keyword.

9. A keyword management method for a keyword management system that manages keywords used when a user terminal connected to a network accesses contents, comprising:

calculating a first Burst value indicating an increase per unit time of a keyword;

performing a morphological analysis in which a computer extracts the same morpheme as a morpheme stored in a user dictionary table from the contents and obtains attribute information corresponding to the extracted morpheme from a morphological-analysis-result management table, of a text included in the contents based on a keyword having the first Burst value equal to or higher than a threshold;

calculating a second Burst value indicating an increase per unit time of a keyword for the keyword obtained as a result of the morphological analysis;

calculating an overall Burst value using the first Burst value and the second Burst value by correcting the first Burst value based on characteristics in the contents of the keyword corresponding to the first Burst value;

extracting from the contents, a relevant keyword related to the keyword corresponding to the overall Burst value based on time series changes of the overall Burst value, and outputting the keyword and the relevant keyword associated with each other to the user terminal; and classifying the keyword corresponding to the overall Burst value into one of plural, previously-prepared types based on the time series changes of the overall Burst value, by calculating time series changes in the overall Burst value for a past certain period, calculating a differential value of the calculated time series changes at a plurality of points in time, and determining a type based on the differential value at each point in time, wherein when outputting the keyword and the relevant keyword associated with each other to the user terminal, further outputting a classification result obtained as a result of keyword classification to the user terminal.

10. The keyword management method according to claim 9, wherein the characteristics in the contents of the keyword include the number of keywords included in titles, the number of linked keywords, and the number of keywords modified in the contents.

11. The keyword management method according to claim 9, wherein when extracting the relevant keyword, extracting a keyword correlated to the time series changes of the overall Burst value as the relevant keyword.

12. The keyword management method according to claim 11, wherein when extracting the relevant keyword, further extracting a keyword co-occurring in the text of the contents with a keyword having the overall Burst value equal to or higher than a threshold, as the relevant keyword.

* * * * *